United States Patent [19]
Davis et al.

[11] Patent Number: 5,491,720
[45] Date of Patent: Feb. 13, 1996

[54] METHOD AND SYSTEM FOR AUTOMATICALLY DETERMINING DATA COMMUNICATION DEVICE TYPE AND CORRESPONDING TRANSMISSION RATE

[75] Inventors: Gordon T. Davis, Raleigh, N.C.; Judith M. Linger, Delray Beach, Fla.; Baiju D. Mandalia, Boca Raton, Fla.; John C. Sinibaldi, Pompano Beach, Fla.; William M. Zevin, Boca Raton, Fla.; Karl-Heinz Ziegenhain, Wiesbaden, Germany

[73] Assignee: International Business Machines Corporation, Armonk, N.Y.

[21] Appl. No.: 887,433

[22] Filed: May 21, 1992

[51] Int. Cl.$^6$ ..................................... H04B 1/38
[52] U.S. Cl. ................. 375/222; 375/225; 370/79; 370/84; 370/85.13
[58] Field of Search ...................... 375/222, 225, 375/377; 370/79, 84, 110.1, 85.13; 371/5.5, 32; 379/97

[56] References Cited

U.S. PATENT DOCUMENTS

| 4,044,307 | 8/1977 | Borysiewicz et al. | 375/219 |
|---|---|---|---|
| 4,215,243 | 7/1980 | Maxwell | 375/222 |
| 4,270,202 | 5/1981 | Stuttard et al. | 370/80 |
| 4,385,384 | 5/1983 | Rosbury et al. | 375/224 |
| 4,782,498 | 11/1988 | Copeland | 375/222 |
| 4,931,250 | 6/1990 | Greszczuk | 375/222 |
| 5,153,897 | 10/1992 | Sumiyoshi et al. | 375/222 |
| 5,311,578 | 5/1994 | Bremer et al. | 379/97 |

OTHER PUBLICATIONS

IEEE International Conference on Communication, Boston-icc/89 Jun. 11–14, Boston, MA., pp. 1101–1105, "Detection of Modem Type and Bit Rate of FSK Voiceband Data Signals".

*Primary Examiner*—Young T. Tse
*Attorney, Agent, or Firm*—Bernard D. Bogdon

[57] ABSTRACT

A method and system in a data communications system for automatically determining a data communication device type and a transmission speed associated with the data communication device type. An incoming communication is detected on a transmission line, and transmit and receive hardware are connected to the transmission line. Next, a sequence of different signals in either a first communication protocol or a second communication protocol are transmitted from a first data communication device via a transmission line. The transmission line is then monitored for a response signal from a second data communication device. The response signal is initiated from the second data communication device in response to receipt of a particular signal within the transmitted sequence of different signals. Utilizing the relationship between the response signal and the transmitted sequence of different signals, a data communication device type and transmission speed are determined, and data communications may then be established between the first data communication device and the second data communication device at an optimal transmission speed.

20 Claims, 8 Drawing Sheets

METHOD AND SYSTEM FOR AUTOMATICALLY DETERMINING DATA COMMUNICATION DEVICE TYPE AND CORRESPONDING TRANSMISSION RATE

BACKGROUND OF THE INVENTION

1. Technical Field

The present invention relates in general to the field of data processing systems and in particular to the field of data communication systems. Still more particularly, the present invention relates to a method and system for automatically determining a data communication device type and a transmission speed associated with the data communication device type.

2. Description of the Related Art

Electronic communication is increasingly common in the world today. For example, messages or documents may be transmitted between parties separated by great geographic distances utilizing modems, facsimile or voice communication systems.

Those skilled in the art will recognize that a modem is used to convert digital bit stream into analog signals that are sent over telephone or other transmission lines to a second modem. The second modem receives the analog signals and reconverts the analog signals back to a digital bit stream. The specific techniques used to encode the digital bit stream into analog signals are called modulation protocols. The various modulation protocols define the exact method of encoding and the data transmission speed.

Transmission speeds vary depending on which type of modem is used. For example, modems can transmit at 9600 bits per second (bps), 2400 bps, 1200 bps or 300 bps. The modulation protocol also identifies whether the modem utilizes frequency-shift keying (FSK) or phase-shift keying (PSK) to encode the data. As known in the art, under FSK the transmitted signal shifts back and forth between two frequencies: one representing a one and the other representing a zero. PSK utilizes shifts in phase to signal ones and zeros.

For modems to be able to transfer data, the modulation protocol of one modem must coincide with the modulation protocol of the second modem. Those skilled in the art will recognize that modems can negotiate certain features, such as error control, data compression, and transmission speed. One method used to negotiate these features is for a modem to first attempt to establish a connection at selected features, and if unsuccessful, to fall back to alternative features.

One feature that is also negotiable is FSK or PSK data encoding procedures. As known in the art, negotiation for data encoding can occur when a separate set of transmit and receive hardware for each supported modem type is provided. The negotiation process is accomplished by connecting each separate set of transmit and receive hardware to the transmission line. Once the negotiation process is successfully completed, only the transmit and receive hardware for the specified modem type remains coupled to the transmission line. All the other separate sets of transmit and receive hardware sits idle for the duration of the data communications. This can become costly in terms of hardware requirements, power requirements, and physical space requirements.

Therefore, it should be obvious that a need exists for a method and system for establishing data communications with modems which minimizes the need to duplicate communication hardware.

SUMMARY OF THE INVENTION

It is therefore one object of the present invention to provide a method and system for establishing data communications between two modems utilizing common hardware.

It is another object of the present invention to provide a method and system for automatically determining a data communication device type and transmission speed associated with a particular data communication device type.

It is yet another object of the present invention to provide a method and system for establishing data communications between a first data communication device and a second data communication device at an optimal transmission speed.

The foregoing objects are achieved as is now described. An incoming communication is detected on a transmission line, and transmit and receive hardware are connected to the transmission line. Next, a sequence of different signals in either a first communication protocol or a second communication protocol are transmitted from a first data communication device via the transmission line. The transmission line is then monitored for a response signal from a second data communication device. The response signal is initiated from the second data communication device in response to receipt of a particular signal within the transmitted sequence of different signals. Utilizing the relationship between the response signal and the transmitted sequence of different signals, a data communication device type and transmission speed are determined, and data communications may then be established between the first data communication device and the second data communication device at an optimal transmission speed.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
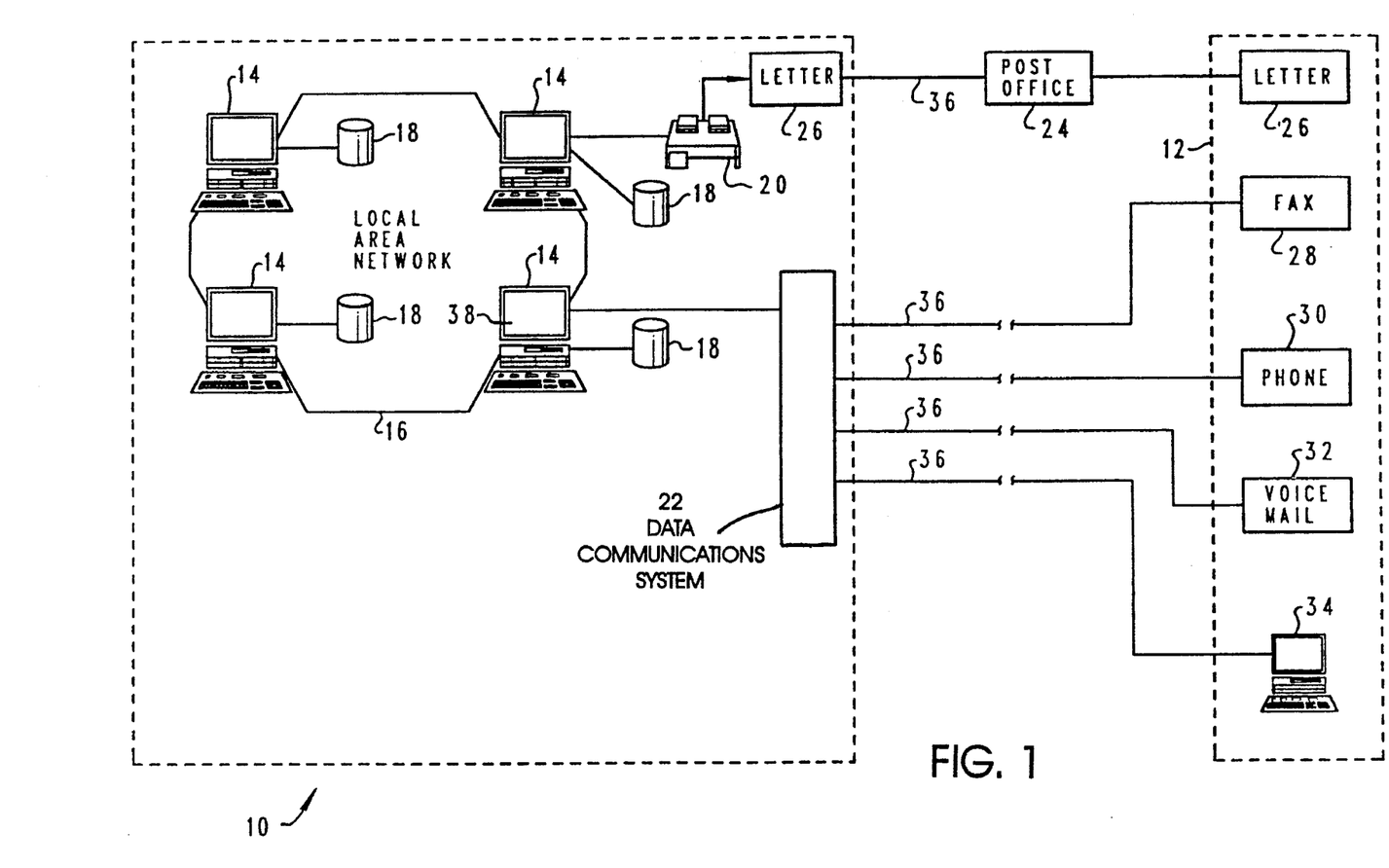
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As may be seen, data processing system 10 may include a plurality of computers 14 which may be connected together in a local area network 16. Of course, those skilled in the art will appreciate that a plurality of intelligent work stations coupled to a host processor may be utilized to implement such network.

As is common in such data processing systems, each individual computer may be coupled to a storage device 18 and/or a printer/output device 20. One or more such storage devices 18 may be utilized, in accordance with the method of the present invention, to store the various data objects or documents which may be periodically accessed and processed by a used within data processing system 10, in accordance with the method and system of the present invention. In a manner well known in the prior art, each such data processing procedure or document may be stored within a storage device 18, which may be associated with a resource manager or library service, which is responsible for maintaining and updating all resource objects associated therewith.

Still referring to FIG. 1, it may be seen that data processing system 10 may communicate with another system 12 which may include a second data processing system, via electronic delivery utilizing a data communications system 22, or by physical delivery using a post office 24. System 12 may also receive messages via various data communication channels 36. As utilized herein, the term data communication channel shall include various electronic distribution systems such as telephone lines, a dedicated facsimile line, and radio signals and shall also include various physical delivery systems such as a postal letter carrier or messenger service. A message may be characterized in various distribution media. As utilized herein, the term distribution media shall include such data communication devices as facsimile 28, telephone modem 30, voice mail 32, electronic mail (e-mail) 34, or letter 26.

Figure 2A:
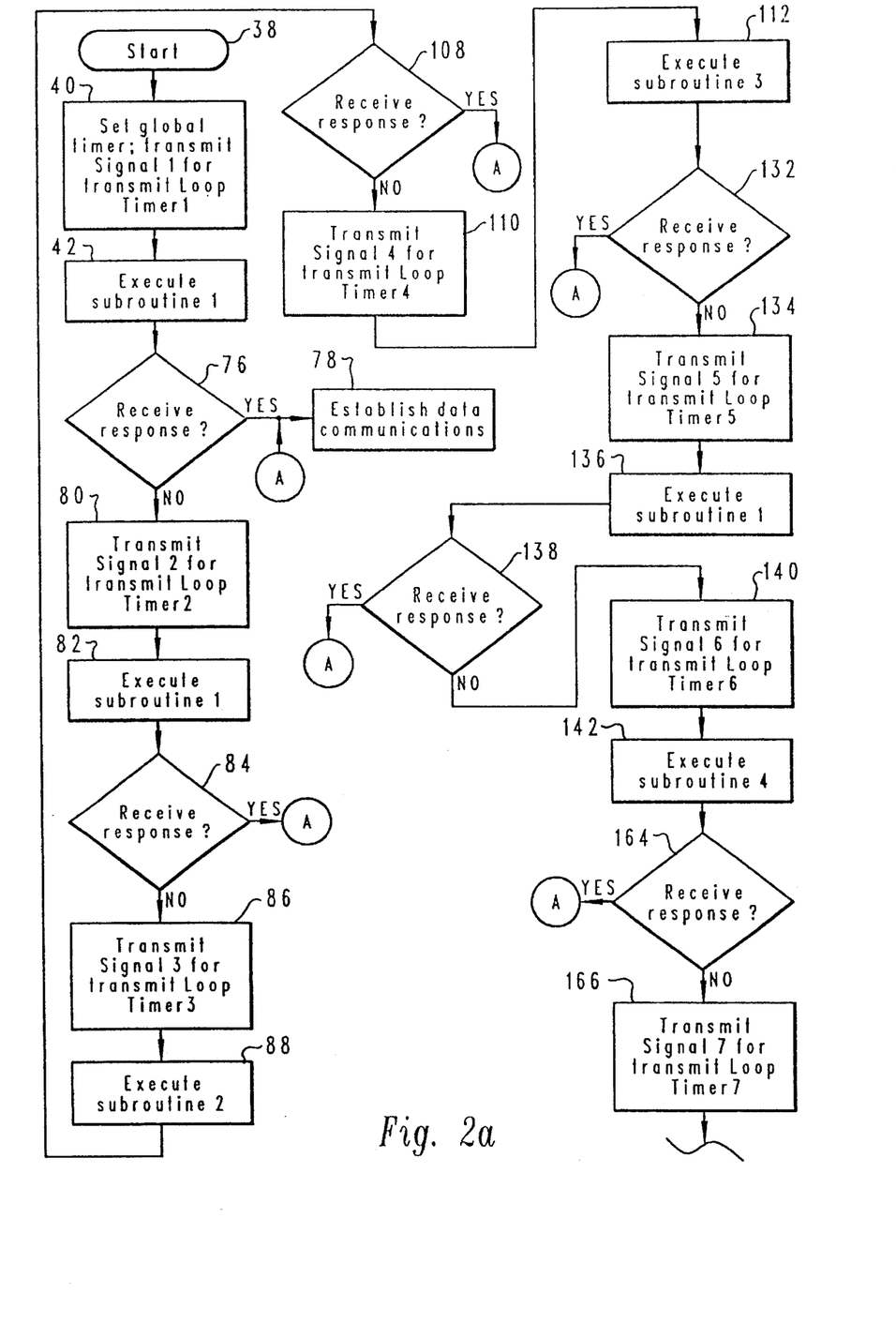
FIGS. 2a–2f are high level flow charts depicting the automatic determination of a data communication device type and the transmission speed associated with the data communication device type in accordance with the method and system of the present invention.
Figure 2B:
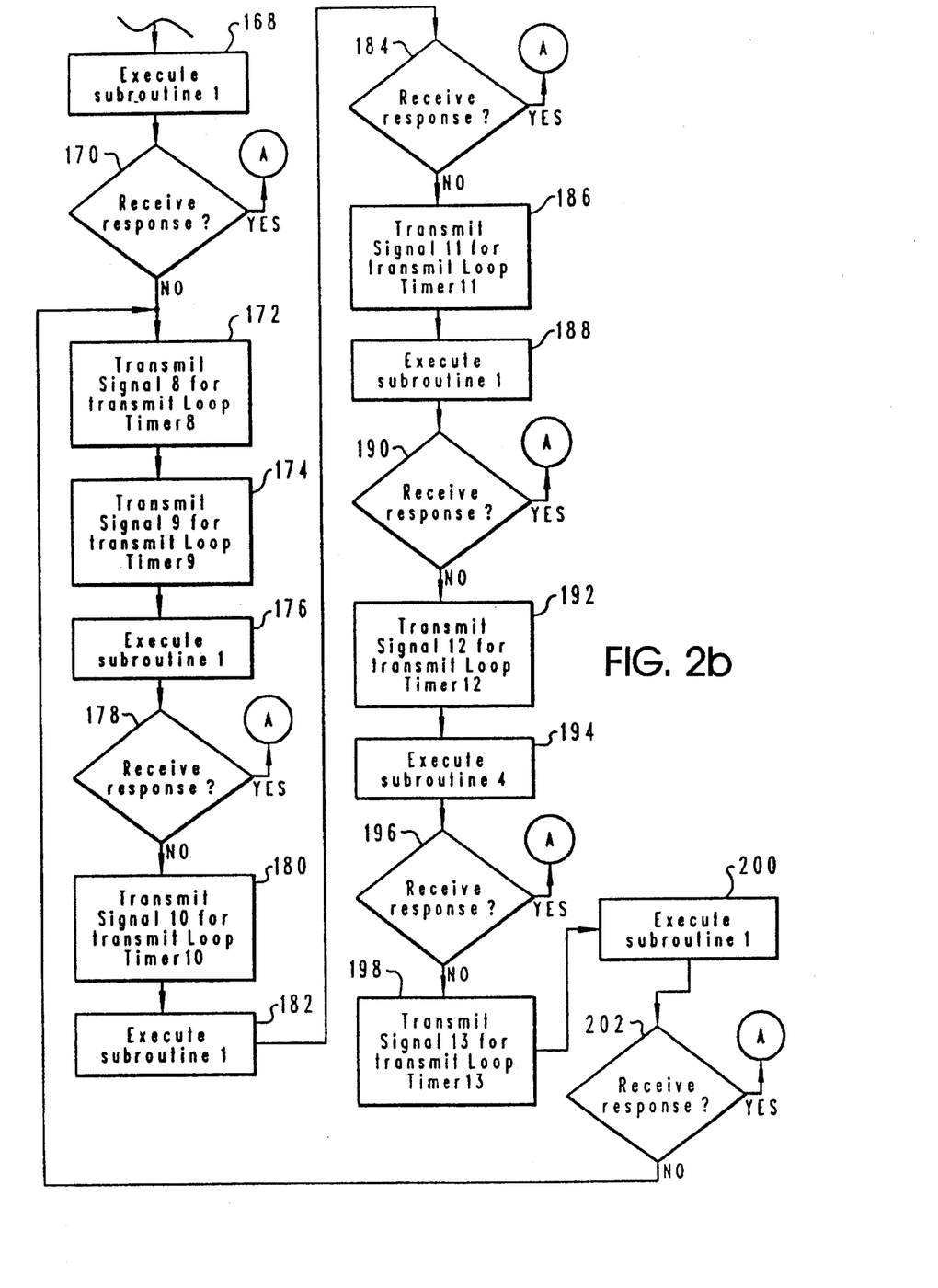

Now referring to FIGS. 2a–2f, there is illustrated high level flow charts depicting a method for automatically determining a data communication device type and the transmission speed associated with the data communication device type in accordance with the method and system of the present invention. An incoming communication is detected on a transmission line, and transmit and receive hardware are connected to the transmission line. Referring initially to FIGS. 2a and 2b, the process begins at block 38 and thereafter passes to block 40 which illustrates the initialization of the method. A global timer is set at a predetermined value, a Signal 1 transmission is initiated, and a selected Transmit Loop Timer 1 is set. In the preferred embodiment, the system and method of the present invention is utilized for two modems attempting to transfer data, and the global timer is set for 5,000 milliseconds (ms), Signal 1 is silence and Transmit Loop Timer 1 is set for 1850 ms. The process then passes to block 42, which depicts execution of subroutine 1. In the preferred embodiment, communications are attempted by scanning for the most commonly used modems first. Additionally, precautions are taken to preclude confusion between the various types of modems.

Figure 2C:
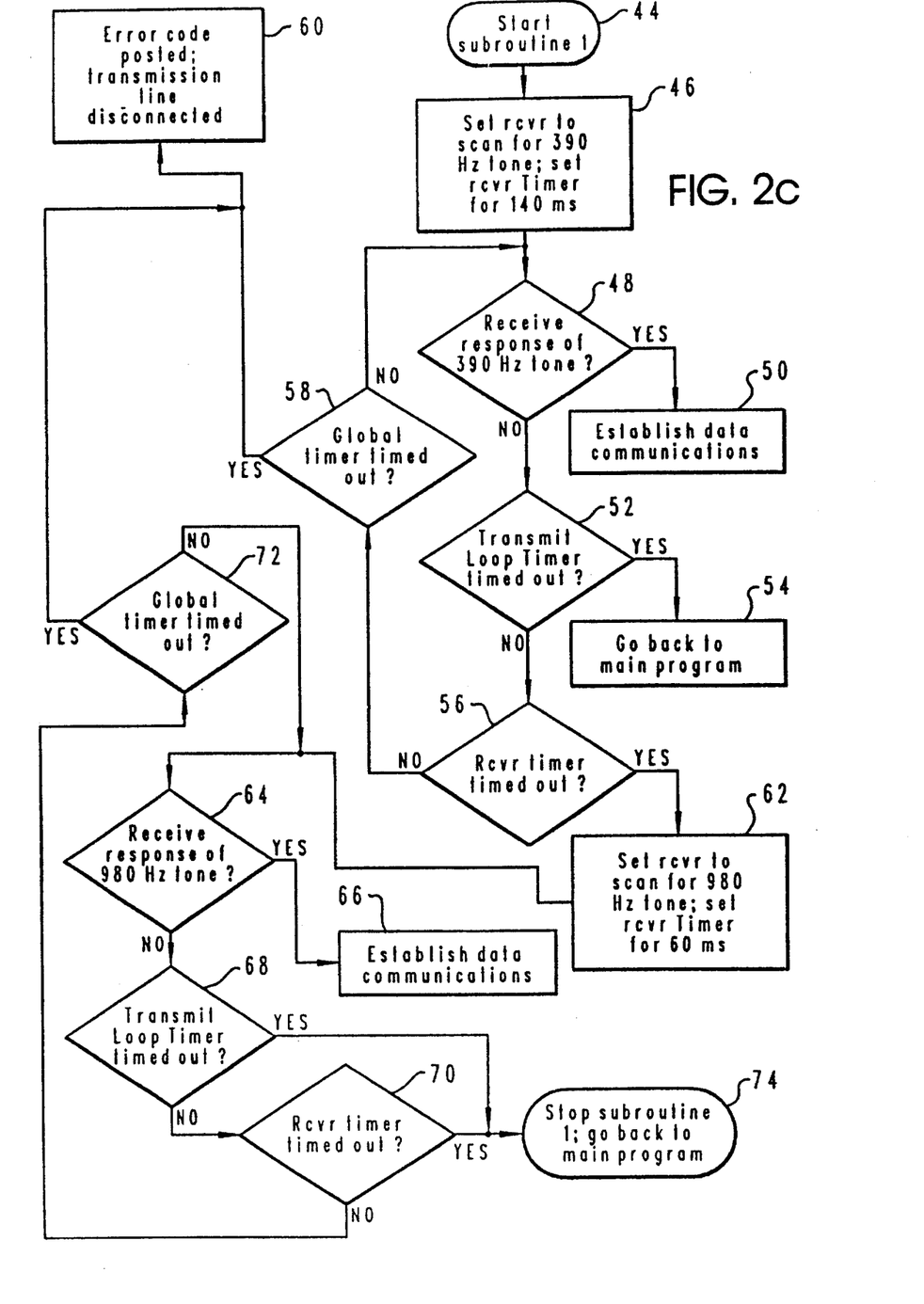

Subroutine 1 is shown in FIG. 2c, and begins at block 44. Block 46 illustrates setting a receiver to scan for a 390 Hertz (Hz) tone and setting the receiver timer for 140 ms. The process then passes to block 48, which depicts a determination of whether or not a 390 Hz response tone is received. If a 390 Hz response tone is received, a particular data communication device type and transmission speed are determined and data communications are established, as shown in block 50.

If a 390 Hz response tone is not received, a determination is made in block 52 as to whether or not the Transmit Loop Timer is timed out. If it is timed out, the process passes to block 54 where subroutine 1 returns to the main program. If the Transmit Loop Timer is not timed out, another determination is made as to whether or not the receiver timer is timed out, as shown in block 56.

If a determination is made that the receiver timer is not timed out, the process passes to block 58, which illustrates a determination of whether or not the global timer set during initialization (see FIG. 2a, block 40) is timed out. If the global timer is timed out, data communications have not been established and block 60 shows an error code is posted and the transmission line is disconnected. If the global timer is not timed out, the process returns to block 48 to continue scanning for a 390 Hz tone.

Referring again to block 56, if a determination is made that the receiver timer is timed out, the process passes to block 62 which depicts setting the receiver to scan for a 980 Hz response tone and setting the receiver timer for 60 ms. Block 64 illustrates a determination of whether or not a response tone of 980 Hz is received. If a response tone is received, a particular data communication device type and transmission speed are determined and data communications are established, as shown in block 66.

If a determination is made that a response tone of 980 Hz is not received, the process passes to block 68 where a determination is made as to whether or not the Transmit Loop Timer is timed out. If the Transmit Loop Timer is timed out, the process jumps to block 74, which illustrates subroutine 1 returning to the main program.

Referring again to block 68, if a determination is made that the Transmit Loop Timer is not timed out, the process passes to block 70 which depicts a determination of whether or not the receiver timer is timed out. If the receiver timer is not timed out, the process continues at block 72, which illustrates a determination of whether or not the global timer is timed out.

If the global timer is timed out, data communications have not been established and the process passes to block 60 which shows an error code is posted and the transmission line is disconnected. If the global timer is not timed out, the process returns to block 64 to continue scanning for a 980 Hz tone. Finally, referring again to block 70, if a determination is made that the receiver timer is timed out, subroutine 1 returns to the main program, as illustrated in block 74.

Thus, in the preferred embodiment, subroutine 1 is utilized to detect FSK configured modems. Modems detected during this call to subroutine 1 are modems which do not require Consultative Committee for International Telephone and Telegraph (CCITT) V.25 auto-answer protocol and which transmit their starting signal as soon as they are connected to the transmission line, regardless of whether Signal 1 is transmitted or not. Calling subroutine 1 at this point in the process speeds up detection of modems which transmit their starting signal as soon as the modems are connected to a transmission line. Signal 1 is a required part of the CCITT V.25 auto-answer protocol and is transmitted at this point in the process for the benefit of modems that require it.

Referring again to FIG. 2a, block 76 illustrates a determination of whether or not a response tone was received during execution of subroutine 1, shown in FIG. 2b. If a response was received, data communications are established as shown in block 78. If a response was not received, the process continues at block 80 which depicts the initiation of a transmission of Signal 2 and setting a selected Transmit Loop Timer 2. In the preferred embodiment, Signal 2 is a 2100 Hz tone and Transmit Loop Timer is set for 2650 ms.

Thereafter, the process continues at block 82, which illustrates execution of subroutine 1. Subroutine 1 is described above with reference to FIG. 2c.

Thus, in the preferred embodiment, the 2100 Hz tone is a required part of the CCITT V.25 auto-answer protocol. Scanning for a 390 Hz response tone for 140 ms allows for the detection of certain V.23 configured modems. And, by scanning for a 980 Hz response tone, certain V.21 configured modems are detected.

Referring still to FIG. 2a, block 84 illustrates a determination of whether or not a response tone was received during execution of subroutine 1, shown in FIG. 2c. If a response was received, data communications are established as shown in block 78. If a response was not received, the process continues at block 86 which depicts the initiation of a transmission of Signal 3 and setting a selected Transmit Loop Timer 3. In the preferred embodiment, Signal 3 is silence and Transmit Loop Timer is set for 75 ms.

Figure 2D:
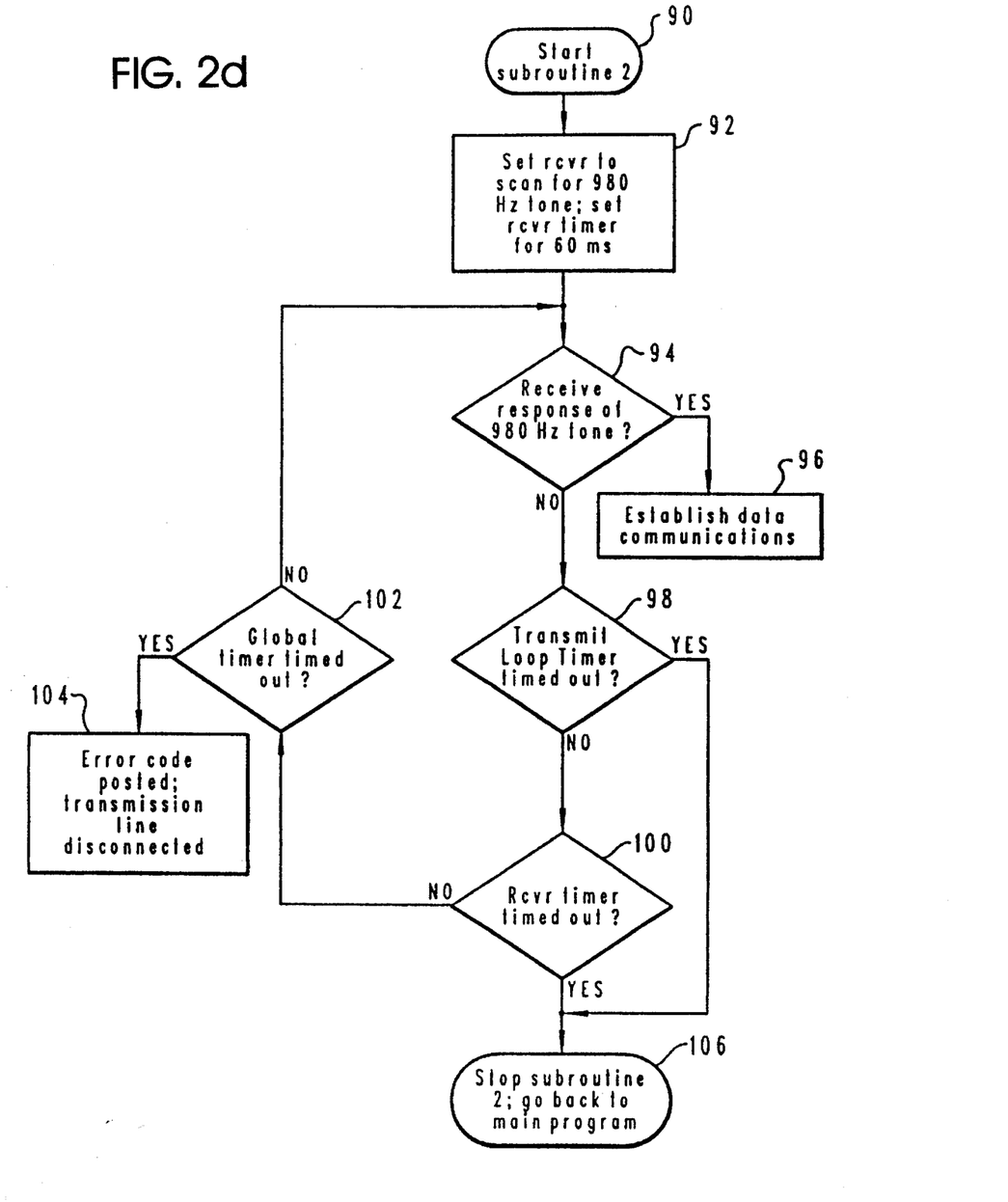
Figure 2E:
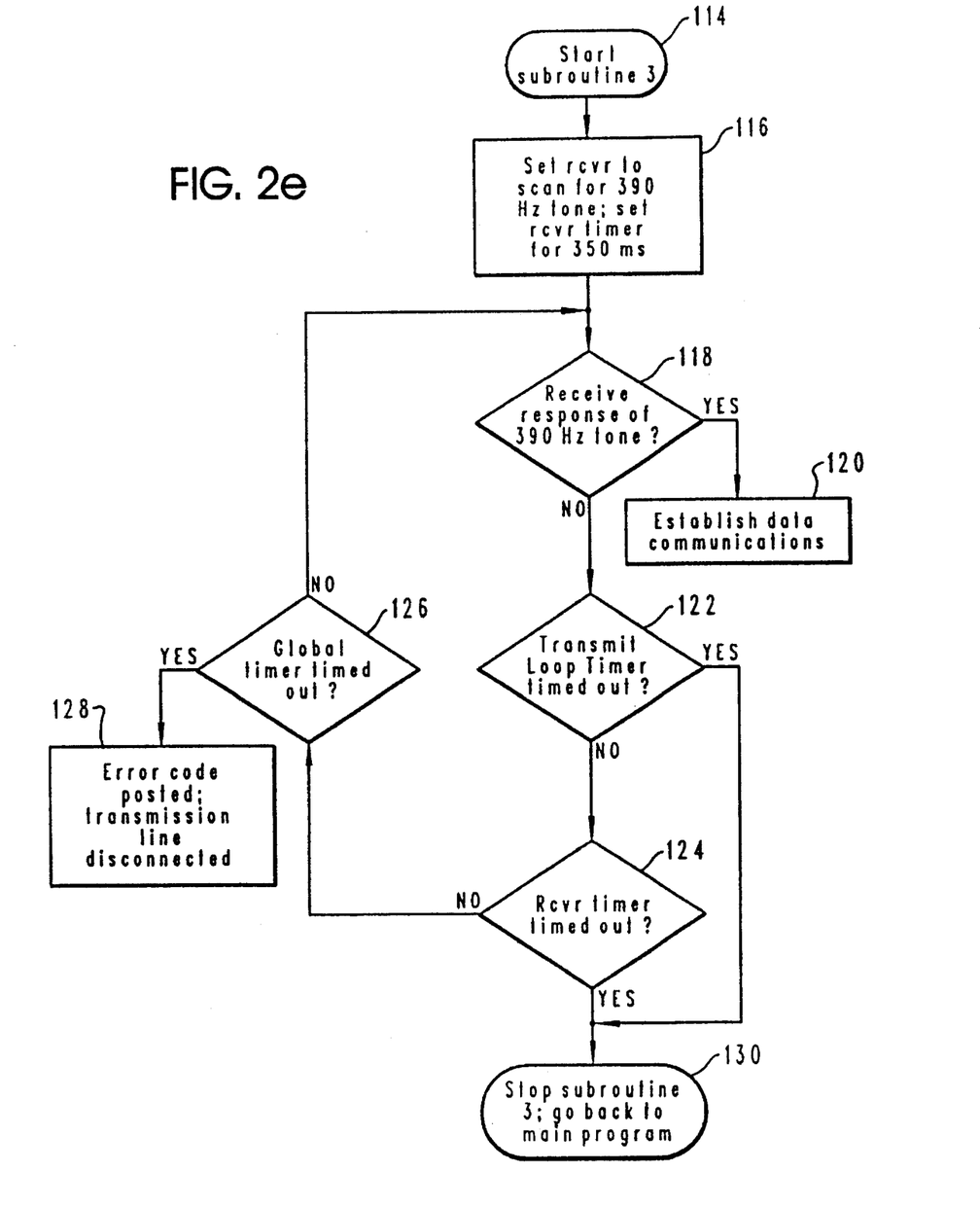

The process then passes to block 88, which depicts execution of subroutine 2. Subroutine 2 is illustrated in FIG. 2d. Subroutine 2 begins at block 90, and thereafter passes to block 92 which depicts setting a receiver to scan for a 980 Hz tone and setting the receiver timer for 60 ms. Block 94 illustrates a determination of whether or not a response tone of 980 Hz is received. If a response tone is received, a particular data communication device type and transmission speed are determined and data communications are established, as shown in block 96.

If a determination is made that a response tone of 980 Hz is not received, the process passes to block 98 where a determination is made as to whether or not the Transmit Loop Timer is timed out. If the Transmit Loop Timer is timed out, the process jumps to block 106, which illustrates subroutine 2 returning to the main program.

Referring again to block 98, if a determination is made that the Transmit Loop Timer is not timed out, the process passes to block 100 which depicts a determination of whether or not the receiver timer is timed out. If the receiver timer is not timed out, the process passes to block 102 which illustrates a determination of whether or not the global timer is timed out.

If the global timer is timed out, data communications have not been established and block 104 shows an error code is posted and the transmission line is disconnected. If the global timer is not timed out, the process returns to block 94 to continue scanning for a 980 Hz response tone. Finally, referring again to block 100, if a determination is made that the receiver timer is timed out, subroutine 2 returns to the main program, as illustrated in block 106.

Thus, in the preferred embodiment, subroutine 2 is utilized to detect FSK configured modems. The 75 ms of silence is a required part of the CCITT V.25 auto-answer protocol. By transmitting silence for 75 ms and scanning for a 980 Hz response tone for 60 ms, certain V.21 configured modems are detected.

Referring again to FIG. 2a, block 108 illustrates a determination of whether or not a response tone was received during execution of subroutine 2, shown in FIG. 2d. If a response was received, data communications are established as shown in block 78. If a response was not received, the process continues at block 110 with the initiation of a transmission of Signal 4 and setting a selected Transmit Loop Timer 4. In the preferred embodiment, Signal 4 is a 1300 Hz tone and Transmit Loop Timer is set for 350 ms.

The process then continues at block 112, which depicts execution of subroutine 3. Subroutine 3 is illustrated in FIG. 2d. Subroutine 3 begins at block 114, and thereafter passes to block 116 which depicts setting a receiver to scan for a 390 Hz tone and setting the receiver timer for 350 ms. Block 118 illustrates a determination of whether or not a response tone of 390 Hz is received in response to transmitting Signal 4. If a response tone is received, a particular data communication device type and transmission speed are determined and data communications are established, as shown in block 120.

If a determination is made that a response tone of 390 Hz is not received, the process passes to block 122 where a determination is made as to whether or not the Transmit Loop Timer is timed out. If the Transmit Loop Timer is timed out, the process jumps to block 130, which illustrates subroutine 3 returning to the main program.

Referring again to block 122, if a determination is made that the Transmit Loop Timer is not timed out, the process passes to block 124 which depicts a determination of whether or not the receiver timer is timed out. If the receiver timer is not timed out, the process passes to block 126 which illustrates a determination of whether or not the global timer is timed out.

If the global timer is timed out, data communications have not been established and block 128 depicts the posting of an error code and disconnecting the transmission line. If the global timer is not timed out, the process returns to block 118 to continue scanning for a 390 Hz response tone. Referring again to block 124, if a determination is made that the receiver timer is timed out, subroutine 3 returns to the main program, as illustrated in block 130.

Thus, in the preferred embodiment, subroutine 3 is utilized to detect FSK configured modems. By transmitting a 1300 Hz tone for 350 ms and scanning for a 390 Hz response tone for 350 ms, certain V.23 configured modems are detected.

Referring again to FIG. 2a, block 132 illustrates a determination of whether or not a response tone was received during execution of subroutine 3, shown in FIG. 2c. If a response was received, data communications are established as shown in block 78. If a response was not received, the process continues at block 134 with the initiation of a transmission of Signal 5 and setting a selected Transmit Loop Timer 5. In the preferred embodiment, Signal 5 is silence and Transmit Loop Timer is set for 300 ms.

Thereafter, the process passes to block 136, which depicts execution of subroutine 1. In the preferred embodiment, subroutine 1 is utilized to detect FSK configured modems. Transmitting silence for 300 ms is performed to streamline detection of PSK modems during execution of subroutine 4, which is described in greater detail below. Scanning for a 390 Hz response tone for 140 ms detects certain V.23 configured modems, and scanning for a 980 Hz response tone detects certain V.21 configured modems.

Referring still to FIG. 2a, block 138 illustrates a determination of whether or not a response tone was received during execution of subroutine 1, shown in FIG. 2c. If a response was received, data communications are established as shown in block 78. If a response was not received, the process continues at block 140 with the initiation of a transmission of Signal 6 and setting a selected Transmit Loop Timer 6. In the preferred embodiment, Signal 6 comprises unscrambled 1 bits and Transmit Loop Timer is set for 1600 ms.

Figure 2F:
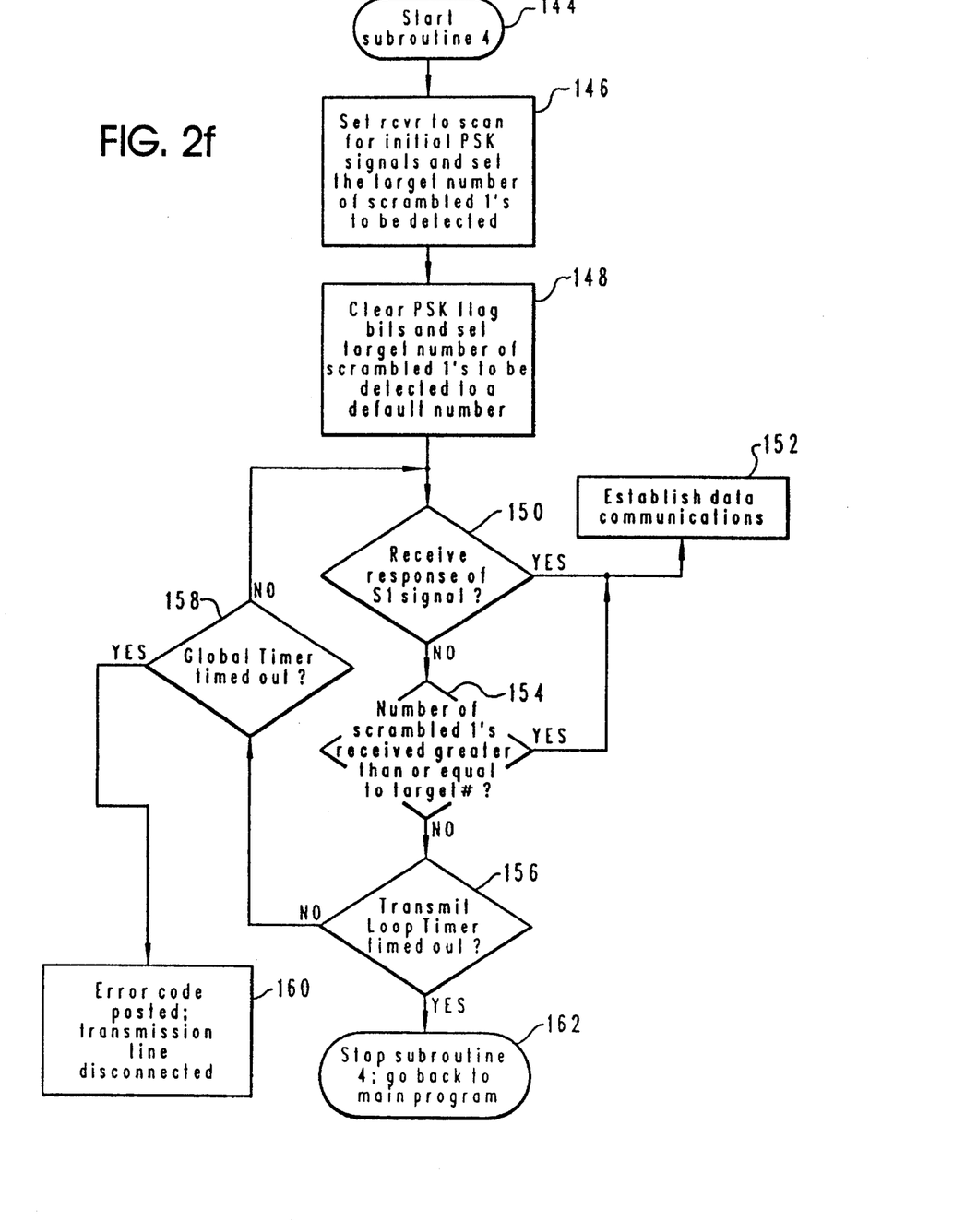

Thereafter, the process continues at block 142, which depicts execution of subroutine 4. Subroutine 4 is illustrated in FIG. 2f. Subroutine 4 is utilized in the preferred embodiment to detect PSK configured modems, and begins at block 144. Block 146 illustrates setting a receiver to scan for initial PSK signals and setting the target number of scrambled 1 bits to be detected. The present invention detects PSK modems not by tones or frequencies, as known in the prior art, but by looking for specific strings of binary 1's and 0's. The process then passes to block 148 which depicts clearing certain PSK flag bits and ensures the bit counter has been set for the target number of scrambled 1 bits.

Block 150 illustrates a determination of whether or not a response signal is received. If a response signal is received, the modem is known to be a V.22 bis modem, and data communications are established, as shown in block 152. If a response signal is not received, the process passes to block 154 which depicts a determination of whether or not the number of scrambled 1 bits received is greater or equal to the target number.

If the number of scrambled 1 bits is greater or equal to the target number, the calling modem is assumed to be a V.22 modem and data communications are established as shown in block 152. Referring again to block 154, if a determination is made that the number of scrambled 1 bits is not greater or equal to the target number, the process passes to block 156 which illustrates a determination of whether or not the Transmit Loop Timer is timed out. If the Transmit Loop Timer is not timed out, the process continues at block 158 with a determination of whether or not the global timer is timed out.

If the global timer is timed out, data communications have not been established and block 160 illustrates an error code is posted and the transmission line is disconnected. If the global timer is not timed out, the process returns to block 150 to continue to scanning for a response signal. Lastly, referring again to block 156, if a determination is made that the Transmit Loop Timer is timed out, subroutine 4 returns to the main program, as shown in block 162.

Referring again to FIG. 2a, block 164 illustrates a determination of whether or not a response signal was received during execution of subroutine 4, shown in FIG. 2f. If a response was received, data communications are established as shown in block 78. If a response was not received, the process continues at block 166 with the initiation of a transmission of Signal 7 and setting a selected Transmit Loop Timer 7. In the preferred embodiment, Signal 7 is a 1300 Hz tone and Transmit Loop Timer is set for 1600 ms.

The process then continues at block 168, with FIG. 2b which depicts execution of subroutine 1. Subroutine 1 is described above with reference to FIG. 2c. In the preferred embodiment, subroutine 1 is utilized to detect FSK configured modems. A 1300 Hz tone is the starting signal for V.23 modems and is disregarded by V.21 modems. Thus, scanning for a 390 Hz response tone for 140 ms detects certain V.23 configured modems. And, by scanning for a 980 Hz response tone, certain V.21 configured modems are detected.

Referring still to FIG. 2b, block 170 illustrates a determination of whether or not a response signal was received during execution of subroutine 1. If a response was received, data communications are established as shown in block 78. If a response was not received, the process continues at block 172 with the initiation of a transmission of Signal 8 and setting a selected Transmit Loop Timer 8. In the preferred embodiment, Signal 8 is silence and Transmit Loop Timer is set to 20 ms. After Transmit Loop Timer 8 is timed out, the process passes to block 174, which depicts the initiation of a transmission of Signal 9 and setting a selected Transmit Loop Timer 9. In the preferred embodiment, Signal 9 is a 1300 Hz tone and Transmit Loop Time is set for 130 ms.

Thereafter, the process continues at block 176, which illustrates execution of subroutine 1. Subroutine 1 is described above with reference to FIG. 1c, and is utilized to detect either V.21 or V.23 modems.

Continuing to refer to FIG. 2b, block 178 depicts a determination of whether or not a response tone was received during execution of subroutine 1. If a response was received, data communications are established as shown in block 78. If a response was not received, the process continues at block 180 which illustrates initiating a transmission of Signal 10 and setting a selected Transmit Loop Timer 10. In the preferred embodiment, Signal 10 is a 1650 Hz tone and Transmit Loop Time is set for 4900 ms.

Thereafter, the process passes to block 182, which illustrates execution of subroutine 1. A 1650 Hz tone is the starting signal for V.21 modems and is disregarded by V.23 modems. Subroutine 1 is described above with reference to FIG. 2c, and is utilized to detect either V.21 or V.23 modems.

Referring still to FIG. 2b, block 184 depicts a determination of whether or not a response tone was received during execution of subroutine 1. If a response was received, data communications are established as shown in block 78. If a response was not received, the process continues at block 186 which illustrates initiating a transmission of Signal 11 and setting a selected Transmit Loop Timer 11. In the preferred embodiment, Signal 11 is silence and Transmit Loop Time is set for 300 ms.

Thereafter, the process continues at block 188, which depicts execution of subroutine 1. Subroutine 1 is described above with reference to FIG. 2c, and is utilized to detect either V.21 or V.23 modems.

Continuing to refer to FIG. 2b, block 190 illustrates a determination of whether or not a response tone was received during execution of subroutine 1. If a response was received, data communications are established as shown in block 78. If a response was not received, the process passes to block 192 which depicts initiating a transmission of Signal 12 and setting a selected Transmit Loop Timer 12. In the preferred embodiment, Signal 12 is unscrambled one bits and Transmit Loop Timer is set for 1600 ms.

Thereafter, the process continues at block 194, which depicts execution of subroutine 4. Subroutine 4 is described above with reference to FIG. 2f, and is utilized to detect V.22 bis or V.22 modems.

Referring still to FIG. 2b, block 196 illustrates a determination of whether or not a response was received during execution of subroutine 4. If a response was received, data communications are established as shown in block 78. If a response was not received, the process passes to block 198 which depicts initiating a transmission of Signal 13 and setting a selected Transmit Loop Timer 13. In the preferred embodiment, Signal 13 is a 1300 Hz tone and Transmit Loop Time is set for 4900 ms.

Thereafter, the process passes to block 200, which illustrates execution of subroutine 1. Subroutine 1 is described above with reference to FIG. 2c, and is utilized to detect either V.21 or V.23 modems.

Continuing to refer to FIG. 2b, block 202 depicts a determination of whether or not a response tone was received during execution of subroutine 1. If a response was received, data communications are established as shown in block 78. If a response was not received, the process returns to block 172 to continue attempting to detect response signals to the various transmitted signals. The process will continue until either a response is detected or the global timer times out.

The above described invention provides a method for establishing data communications between two modems using only the hardware actually required to transmit and receive data after a call is established. The invention also allows for multiple data communication channels to be handled with minimal duplication of hardware.

Figure 3:
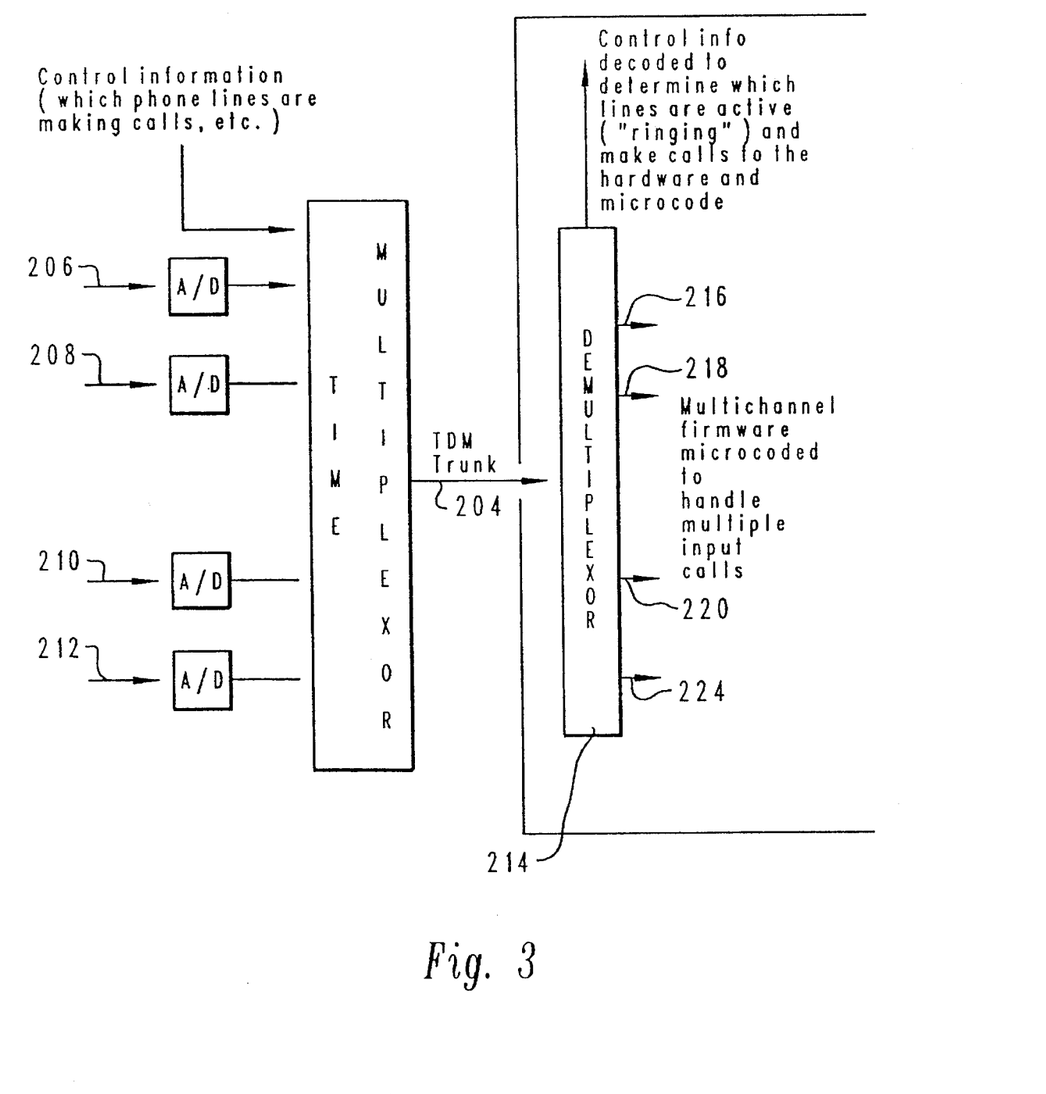
FIG. 3 is a pictorial representation of a data communications system which may be utilized to implement the method and system of the present invention.

FIG. 3 is a pictorial representation of a data communications system which may be utilized to implement the method and system of the present invention. FIG. 3 represents the data communications system 22 illustrated in FIG. 1. A single time division multiplexed (TDM) transmission line 204 is utilized to bring in multiple channels 206, 208, 210, 212. Hardware 214 automatically de-multiplexes the incoming signal back into corresponding individual channels 216, 218, 220, 224. Therefore, in this environment, support for multiple channels involves only multiple calls to the modem detection software code described above. The only hardware required during the detection process is that which would be required to transmit and receive data after the connection is established. No special hardware is required for the detection process.

The present invention also provides for the automatic determination of modem type and transmission speed. Although the present invention is described with reference to data communications between two modems, the term data communications is meant to describe any communications between two devices which utilize analog signals.

While the invention has been particularly shown and described with reference to a preferred embodiment, it will be understood by those skilled in the art that various changes in form and detail may be made therein without departing from the spirit and scope of the invention.

We claim:

1. A method in a data communication system for automatically determining a data communication device type and a transmission speed associated with said data communication device type, wherein said data communication system comprises a first data communication device and at least a second data communication device couplable to said first data communication device over a transmission line, said method comprising the steps of:

initiating transmission in a first communication protocol of a sequence of different signals from said first data communication device via said transmission line at predetermined intervals;

monitoring said transmission line for an occurrence of a response signal from said second data communication device;

initiating the response signal from said second data communication device in response to receipt of a particular signal within said sequence of different signals;

utilizing a relationship between said occurrence of said response signal and the transmission of said sequence of different signals to determine the data communication device type and the transmission speed for said second data communication device, wherein data communications may be established between said first data communication device and said second data communication device at an optimal transmission speed.

2. The method in the data communication system for automatically determining the data communication device type and the transmission speed associated with said data communication device type according to claim 1, wherein said transmission of said sequence of different signals further includes transmission of a sequence of different signals in a second communications protocol.

3. The method in the data communication system for automatically determining the data communication device type and the transmission speed associated with said data communication device type according to claim 2, wherein said first data communication device is adapted to receive one of a plurality of channel requests from one of a plurality of associated data communication devices.

4. The method in the data communication system for automatically determining the data communication device type and the transmission speed associated with said data communication device type according to claim 3, wherein said first data communication device comprises a modem.

5. The method in the data communication system for automatically determining the data communication device type and the transmission speed associated with said data communication device type according to claim 4, wherein said first communication protocol comprises a frequency-shift keying protocol.

6. The method in the data communication system for automatically determining the data communication device type and the transmission speed associated with said data communication device type according to claim 5, wherein said second communication protocol comprises a phase-shift keying protocol.

7. The method in the data communication system for automatically determining the data communication device type and the transmission speed associated with said data communication device type according to claim 1, further comprising the step of terminating communications between said first data communication device and said second data communication device in response a failure to monitor the response signal within a select period of time.

8. The method in the data communication system for automatically determining the data communication device type and the transmission speed associated with said data communication device type according to claim 1, further comprising the step of interrupting said transmission of said sequence of different signals in response to receiving the response signal from said second data communication device.

9. The method in the data communication system for automatically determining the data communication device type and the transmission speed associated with said data communication device type according to claim 8, wherein said second data communication device comprises a modem.

10. The method in the data communication system for automatically determining the data communication device type and the transmission speed associated with said data communication device type according to claim 1, wherein said step of utilizing the relationship between the response signal and the transmission of said sequence of different signals comprises determining a temporal relationship between the response signal and the transmission of said sequence of different signals to determine the data communication device type and the transmission speed for said second data communication device.

11. A data communication system for automatically determining a data communication device type and a transmission speed associated with said data communication device type, wherein said data communication system comprises:

a first data communication device and at least a second data communication device couplable to said first data communication device over a transmission line;

means for initiating transmission in a first communication protocol of a sequence of different signals from said first data communication device via said transmission line at predetermined intervals;

means for monitoring said transmission line for an occurrence of a response signal from said second data communication device;

means for initiating the response signal from said second data communication device in response to receipt of a particular signal within said sequence of different signals; and means for utilizing a relationship between said occurrence of said response signal and the transmission of said sequence of different signals to determine the data communication device type and the transmission speed for said second data communication device, wherein data communications may be established between said first data communication device and said second data communication device at an optimal transmission speed.

12. The data communication system for automatically determining the data communication device type and the transmission speed associated with said data communication device type according to claim 11, wherein said transmission of said sequence of different signals further includes transmission of a sequence of different signals in a second communications protocol.

13. The data communication system for automatically determining the data communication device type and the transmission speed associated with said data communication device type according to claim 12, wherein said first data communication device is adapted to receive one of a plurality of channel requests from One Of a plurality of associated data communication devices.

14. The data communication system for automatically determining the data communication device type and the transmission speed associated with said data communication device type according to claim 13, wherein said first data communication device comprises a modem.

15. The data communication system for automatically determining the data communication device type and the transmission speed associated with said data communication device type according to claim 14, wherein said first communication protocol comprises a frequency-shift keying protocol.

16. The data communication system for automatically determining the data communication device type and the transmission speed associated with said data communication device type according to claim 15, wherein said second communication protocol comprises a phase-shift keying protocol.

17. The data communication system for automatically determining the data communication device type and the transmission speed associated with said data communication device type according to claim 11, further comprising means for terminating communications between said first data communication device and said second data communication device in response a failure to monitor the response signal within a select period of time.

18. The data communication system for automatically determining the data communication device type and the transmission speed associated with said data communication device type according to claim 11, further comprising means for interrupting said transmission of said sequence of different signals in response to receiving the response signal from said second data communication device.

19. The data communication system for automatically determining the data communication device type and the transmission speed associated with said data communication device type according to claim 18, wherein said second data communication device comprises a modem.

20. The data communication system for automatically determining the data communication device type and the transmission speed associated with said data communication device type according to claim 11, wherein said means for utilizing the relationship between the response signal and the transmission of said sequence of different signals comprises means for determining a temporal relationship between the response signal and the transmission of said sequence of different signals to determine the data communication device type and the transmission speed for said second data communication device.

* * * * *